United States Patent
Lang et al.

[11] 3,765,181
[45] Oct. 16, 1973

[54] SERVOSTEERING ARRANGEMENT

[75] Inventors: Armin Lang, Schwalbisch Gmund; Erwin Wiedemann, Mutlangen, both of Germany

[73] Assignee: Zahnradfabrik Friedrichshafen Aktiengesellschaft, Friedrichshafen, Germany

[22] Filed: July 6, 1972

[21] Appl. No.: 269,460

[30] Foreign Application Priority Data
July 3, 1971  Germany................ P 21 33 201.4

[52] U.S. Cl............ 60/386, 60/402, 60/405, 60/425, 180/79.2, 91/412
[51] Int. Cl............................................. F16h 39/48
[58] Field of Search.............. 60/375, 386, 402, 60/405, 425; 91/412; 180/79.2 R

[56] References Cited
UNITED STATES PATENTS
| 446,799 | 2/1891 | Thorpe ............................. 60/97 H |
| 2,616,259 | 11/1952 | Quintilian ......................... 91/412 X |
| 2,370,526 | 2/1945 | Doran ................................. 60/53 C |
| 3,223,382 | 12/1965 | Mercier et al. .................... 60/386 X |
| 3,249,173 | 5/1966 | Gordon .............................. 60/36 X |
| 3,349,744 | 10/1967 | Mercier et al. .................... 91/412 X |

Primary Examiner—Edgar W. Geoghegan
Attorney—Albert M. Zalkind et al.

[57] ABSTRACT

An arrangement of power steering cylinders having connected pistons is provided wherein an engine operated servopump is utilized to pressurize the cylinders. Normally one cylinder is used, but in the vent of predetermined increase in steering resistance the other cylinder is automatically pressurized to aid in the steering force applied. A metering or control pump operated by the steering spindle conrols flow in the system from the servopump and can pressurize both cylinders in the event of failure of the servopump.

7 Claims, 4 Drawing Figures

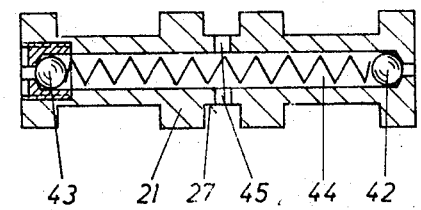
Fig. 2
Fig. 1
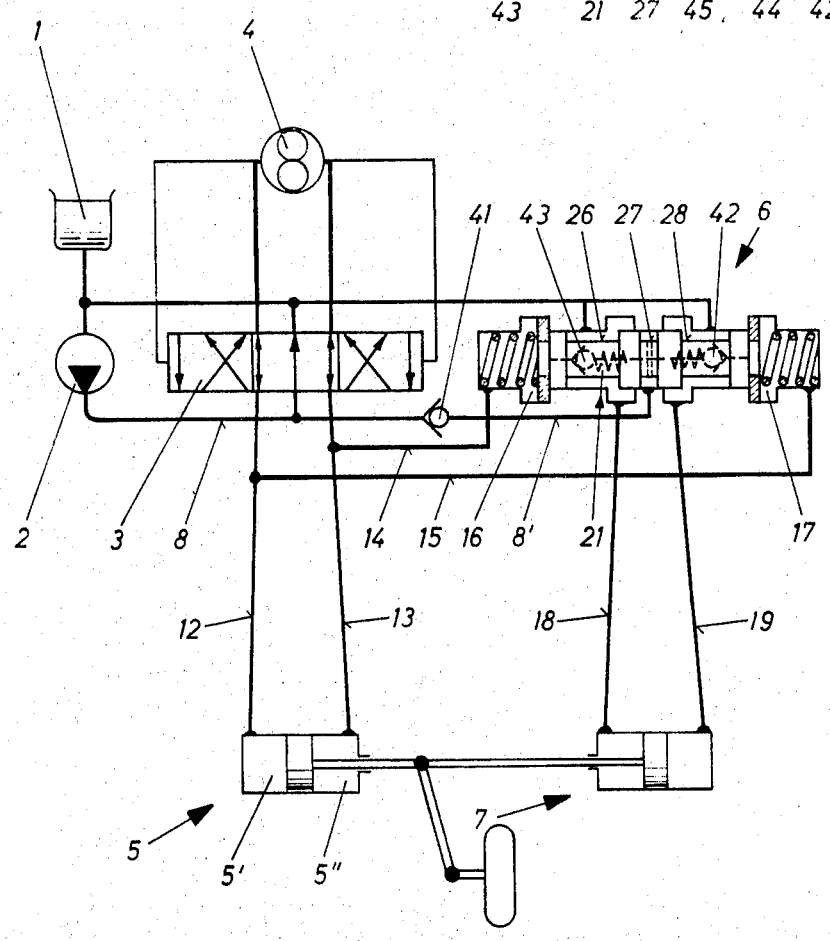

SERVOSTEERING ARRANGEMENT

Reference is made to U.S. Pat. No. 3,554,089, issued Jan. 12, 1971, assigned to the present assignee. In that patent there is a substantial disclosure of the present invention except for the improvement herein that permits operation of the secondary servomotor by manual power rotation of the control pump in the event of loss of primary pump pressure, i.e., servopump output. Thus, in the specific system disclosed in the patent only the primary servomotor can be pressurized by the control pump in the event of servopump failure. However, by providing an arrangement wherein both servomotors are operative by the control pump the usable steering force is increased when it is needed most, i.e., upon failure of the servopump in situations where considerable steering force is needed.

Briefly, the invention comprises essentially a modification of the automatic control valve system of the patent, utilizing pressure feed from the control pump to the inlet of the secondary control valve. Shifting of the control valve spool at a predetermined pressure permits pressure to flow to the secondary servomotor. Check valves are utilized in a cross connection between the sides of the control pump to ensure controlled directional flow to the secondary servomotor cylinder ends through the control valve at a higher predetermined pressure.

In substance the control pump flow parallels the servopump flow to the control valve, through opposed check valves so that automatically selective unidirectional flow can occur for respective ends of the secondary servomotor.

A detailed description of the invention now follows in conjunction with the appended drawing in which:

FIG. 1 is a generally symbolic diagram of one form of the invention;

FIG. 2 is a longitudinal section through the spool of the control valve which controls the secondary servomotor;

Figure 3:
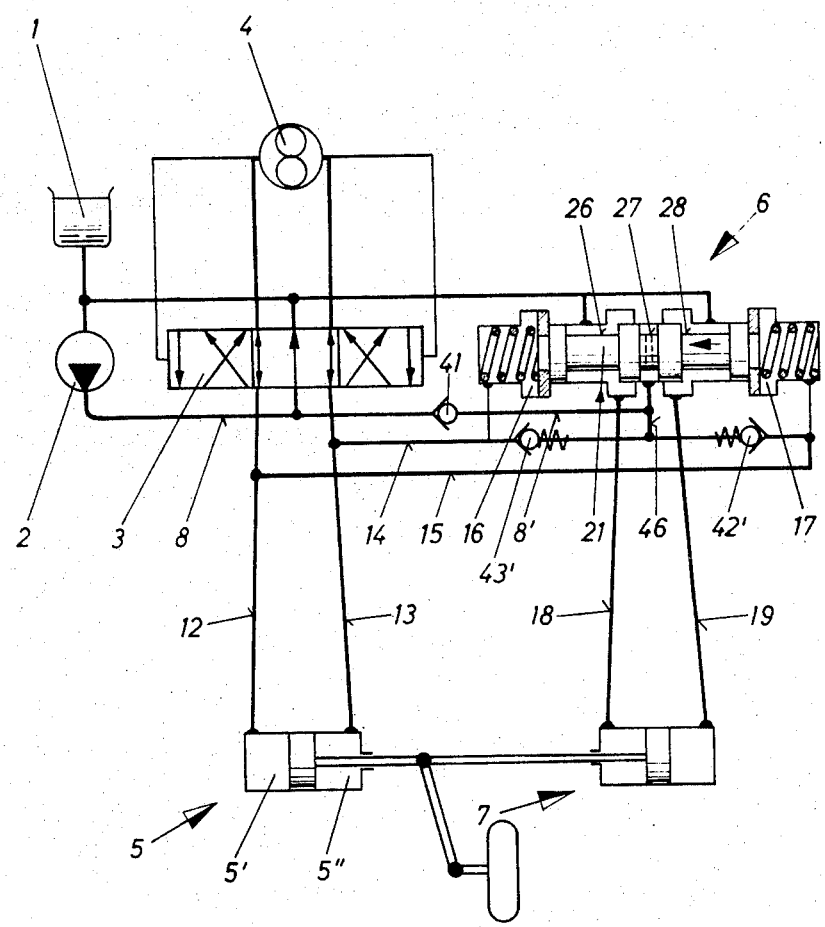
FIGS. 3 and 4 illustrate modifications of the invention.

Referring to FIG. 1, the diagram illustrates a tank 1 for hydraulic fluid which feeds to a servopump 2 having a feed line 8 connecting to a primary valve 3 which is a multiway valve for controlling directional fluid flow to the primary servomotor 5 having the chambers 5' and 5''. The primary valve 3 is pressure actuated in either direction by connection to the sides of a metering or control pump 4 so that the output from pump 2 passes to one side or the other of the control pump which is rotated by the steering spindle. This effects pressure feed to pressure chamber 5' or 5'' of double acting cylinder 5 through the lines 12 and 13, all as heretofore known and explained in the previously mentioned patent.

Likewise, as heretofore disclosed in the previous patent, lines 14 and 15 go to respective chambers 16 and 17 of the secondary valve 6 which has a valve spool 21 reversibly actuatable by predetermined pressure in the chambers 16 and 17.

Normally, the spool is maintained centered in the valve housing by springs, as shown, which are stressed to a predetermined degree in order to provide for predetermined pressure reversible actuation.

The feed line 8 from servopump 2 has access to the inlet portion of the control valve, feeding to inlet groove 27 which has pistons on either side normally cutting off feed pressure to outlet grooves 26 and 28. Accordingly, shifting of the valve spool in either direction can pressurize respective chambers (not numbered) of the secondary servomotor 7 via respective lines 18 and 19 in a manner well understood from the previous patent. Thus, the pistons of the servomotors are tied together to operate a steering mechanism which is normally powered by the primary servomotor 5, but in the event of a predetermined steering resistance met which causes a rise in pressure on a respective side of control pump 4 the control valve 6 is actuated to pressurize, from servopump 2, a respective chamber of secondary servomotor 7 to aid the driver in applying steering force. However, in the invention as thus far described if the primary servopump 2 should fail, there is no pressure feed to the control valve and only the primary servomotor would be fed by hand powered operation of control pump 4 forcing fluid to either of the cylinder chambers depending upon direction of rotation of the steering spindle.

The present invention provides for also pressurizing the secondary servomotor from the control pump 4 in the event of failure of servopump 2. Thus, as shown in FIGS. 1 and 2 the valve spool 21 is provided with an axial through passage 44 connecting with radial passages 45 and having ball check valves 42 and 43 spring biased by a common intermediate spring as shown to normally close each end of the axial passage 44.

It will be noted that in the event of pressurizing of, say, chamber 16 to a predetermined degree the spool valve 21 will shift to the right to permit fluid to enter the righthand chamber of servomotor 7 via the control valve groove 28. The feed at this time is from the servopump 2 through a unidirectional valve 41. The spring which seats the ball check valves 42 and 43 is under greater stress than the springs in chambers 16 and 17 and, accordingly, no pressure feed from control pump 4 is had at the time due to the fact that ball valve 43 remains closed. However, upon further increase of steering resistance a predetermined pressure is reached, which, acting upon ball valve 43 opens that valve whereupon pressure feed from the output side of control pump 4 can then pass through the axial passage 44 and radial passages 45. In view of the previously shifted position of the valve spool 21 such pressure feed can then pass through groove 28 and line 19 to the right hand chanber of the secondary servomotor. Thus, by making the spring which biases the check valves closed dominate the springs which hold the valve spool centered in closing position, pressure in chamber 16 can initially effect shifting of the valve spool 21 to effect its extra power control function.

It will be apparent that rotation of control pump 4 in the opposite direction will provide precisely the opposite effect by initially shifting primary valve 3 upon pressurizing of one end thereof and also shifting the control valve spool 21 by pressurizing chamber 17 and then ultimately, upon a further increase in steering resistance, open the ball valve 42 to pressurize the left hand chamber of servomotor 7 via line 18.

Under the circumstances where pressure feed is effected to the secondary servomotor from the control pump 4, the unidirectional valve 41 prevents reverse flow from the control valve 6 back to the output side of servopump 2.

Referring to the modification shown in FIG. 3, the same reference characters identify the same components found in FIGS. 1 and 2. However, in this instance the valve spool 21 is axially solid and the unidirectional flow control means such as the ball check valves 42' and 43' are not in the valve spool but are inserted between lines 14 and 15 with a connecting line 46 therebetween which connect either side of the control pump 4 to the inlet groove 27 of control valve 6. Thus, the lines 14 and 15 which connect to the sides of the control pump can pressurize the chambers 16 and 17 of the control valve and at the same time feed pressure to open either of the valves 42' or 43' in order to provide flow via the control valve to the secondary servomotor 7. If, for example, the directional force shown by the arrow on the valve spool on FIG. 3 is to the left then the control valve shifts to the left and upon further increase of steering resistance, the pressure in line 15 opens the valve 42' to permit pressure feed to the control valve groove 27 from control pump 4. Obviously, in the event of pressure in chamber 16 occurring, an opposite effect is had whereby check valve 43' is opened. In either case the check valves 42' and 43' permit input pressure from the control pump to the control valve for either direction of rotation of the control pump while at the same time preventing short circuiting of fluid flow between the sides of the control pump, as in the form described for FIGS. 1 and 2.

Figure 4:
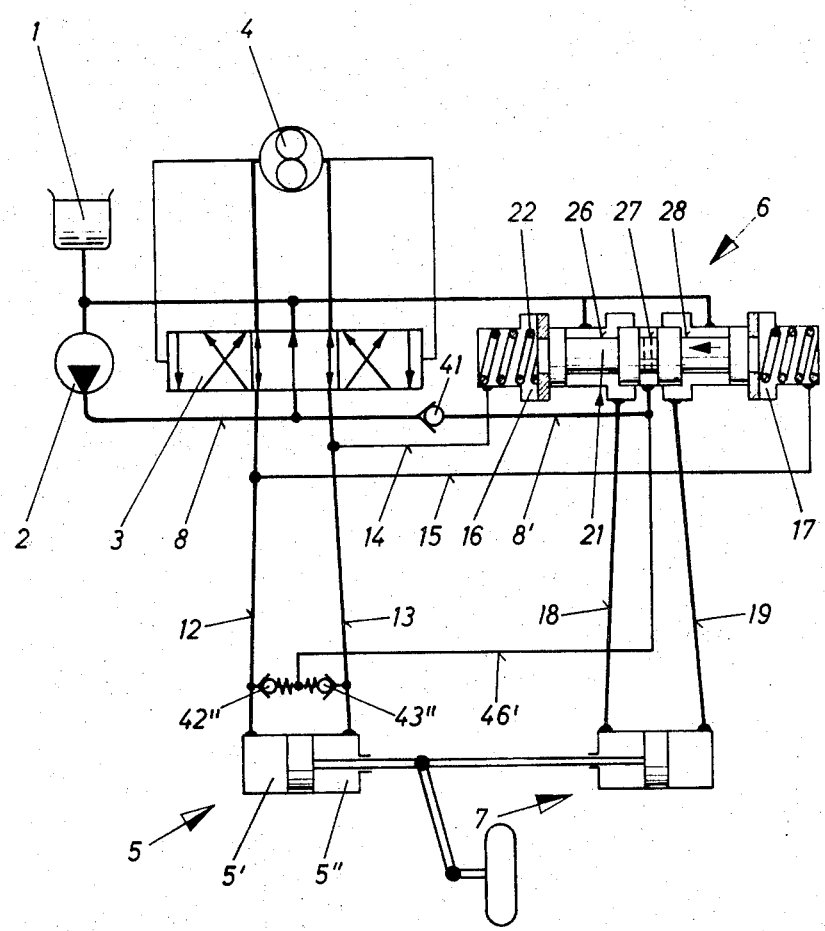

A further modification of the invention is shown in FIG. 4 wherein identical reference characters pertain to identical parts. The ball check valves 42'' and 43'' are connected opposed to each other as in the previous forms of the invention in a channel 46' across lines 12 and 13 of the respective primary servomotor chambers 5' and 5''. The reference numberal 46' will be understood to indicate a feed pressure connection from a point intermediate the ball check valves, such connection being to the inlet groove 27 of control valve 6.

The principle of operation of the embodiment in FIG. 4 is essentially the same, namely, pressure in either line 12 or 13 can ultimately open the respective ball check valve to feed pressure fluid to the control valve for operation of servomotor 7.

In retrospect, as to all three forms of the invention, the feed pressure for opening either of the ball check valves which controls flow to inlet groove 27 is predetermined to a degree greater than that required to shift valve spool 21 which in turn is predetermined to a degree which is greater than that needed to shift primary control valve 3. Accordingly, assuming no failure of pump 2 the invention operates in the manner heretofore described in the previously mentioned patent, where increased steering resistance will bring into play the secondary servomotor 7 fed by output from pump 2. If, however, there should be failure of servopump 2 then control pump 4 can provide power boost pressure fluid to primary servomotor 5 and ultimately to secondary servomotor 7.

What is claimed is:

1. A booster steering system having a servopump and a control pump connected thereto for metering flow therefrom to a primary servomotor and having a primary valve for directing flow to either chamber of a double acting booster cylinder and having a pressure operable secondary valve to control flow to either chamber of double acting secondary servomotor operable in unison with said primary servomotor, wherein said secondary valve is responsive to predetermined pressure at a respective side of said control pump for actuation to pressurize respective chambers of said secondary servomotor from said servopump for assisting in the steering effort of said primary servomotor, said secondary valve having respective pressure chambers for actuation in respective directions and said control pump having respective sides connected to said latter respective pressure chambers; including connection means from said control pump to said secondary valve whereby actuation thereof can provide pressure feed from said secondary pump to said secondary servomotor in event of failure of said servopump, said secondary servomotor being operable by pressure directed thereto through said secondary valve from said control pump.

2. A booster steering system as set forth in claim 1, wherein said connection means comprises respective unidirectional flow control means from respective sides of said control pump to respective pressure chambers of said secondary valve isolating said sides from each other but permitting pressure feed from either side.

3. A booster steering system as set forth in claim 2, wherein said unidirectional means are effected by check valves having means whereby respective unidirectional flow control means are operated at a predetermined pressure higher than the predetermined pressure effecting operation of said secondary valve.

4. A booster steering system as set forth in claim 3, said unidirectional flow control means and said pressure predetermining means comprising ball check valves having respective springs effecting closure thereof.

5. A booster steering system as set forth in claim 4, including a connection from said servopump to said secondary valve for providing feed pressure thereto and a unidirectional valve means in said connection to prevent reversal of flow from said secondary valve to said servopump when said control valve is fed pressure from said control pump.

6. In a booster steering system as set forth in claim 5, said control valve having pressure chambers and comprising a valve spool having an axial passageway therethrough and a pair of check valves in said passageway spring biased to close in opposite directions and exposed to pressure in respective pressure chambers of said control valve to be opened by said pressure; means for feeding fluid pressure from either side of said control pump to said respective pressure chambers for actuating said valve spool and a respective check valve; including passage means through said valve spool for flow from said axial passage for pressure feed from either said check valve to a respective chamber of said secondary servomotor upon actuation of said valve spool by predetermined pressure in either pressure chamber of said control valve and opening of a respective check valve by a higher predetermined pressure.

7. A booster steering system as set forth in claim 4, wherein said control valve has an inlet, and has outlets connected to said secondary servomotor, and has a valve spool with piston ends acting in respective pressure chambers for actuation of said valve spool in a respective direction depending upon pressurizing of one chamber or the other to pressurize a respective chamber of said secondary servomotor via a respective outlet; including connection means between the sides of said control pump with a pair of check valves therein openable in opposite directions and a connection from said connection means to said inlet of said control valve from a point intermediate said check valves.

* * * * *